Sept. 14, 1954
E. H. LAND
2,689,308
DETECTING DEVICE
Filed May 22, 1952
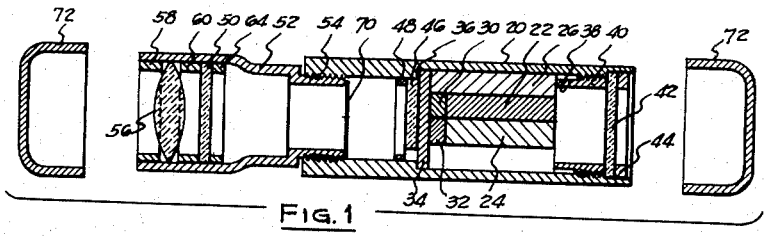
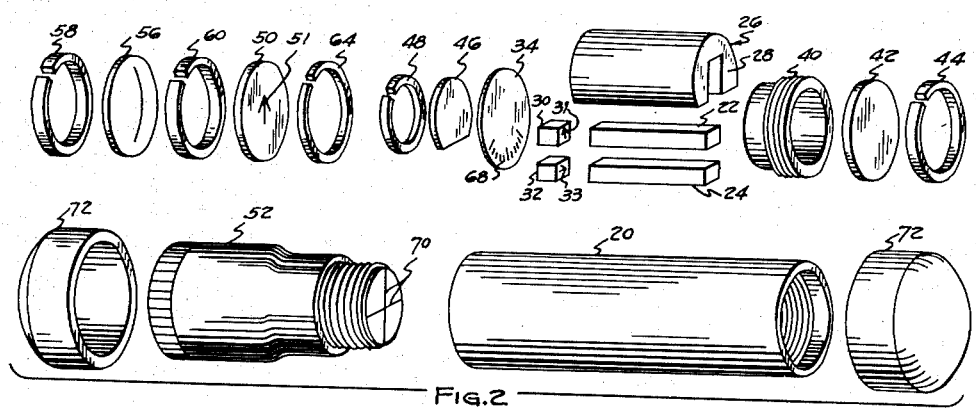
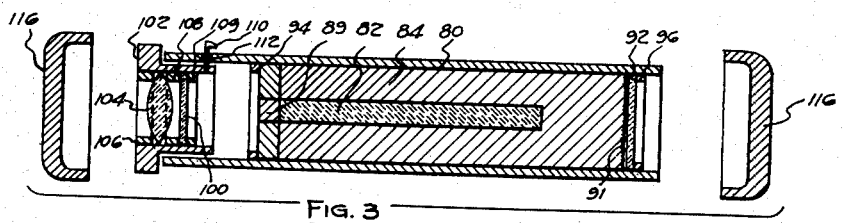
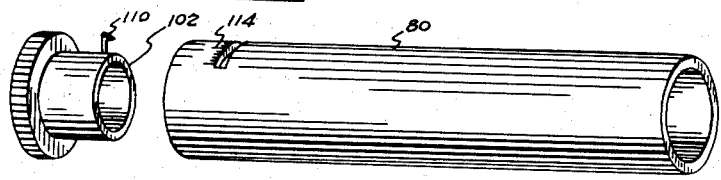
Edwin H. Land
INVENTOR
BY Brown and Mikulka
and
Gerald Altman
ATTORNEYS Patented Sept. 14, 1954

2,689,308

UNITED STATES PATENT OFFICE 2,689,308

DETECTING DEVICE

Edwin H. Land, Cambridge, Mass., assignor to Polaroid Corporation, Cambridge, Mass., a corporation of Delaware Application May 22, 1952, Serial No. 289,297

11 Claims. (Cl. 250—83)

This invention relates to detecting means and more particularly to apparatus of this character, commonly known as dosimeters, for detecting and measuring X- and gamma radiation.

An object of the present invention is to provide a detecting device which comprises a detecting element that changes in optical characteristics when subjected to a particular phenomenon and means for measuring the change in said optical characteristics.

Another object of the present invention is to provide a detecting device of the above character wherein the change in optical characteristics of said detecting element is measurable by means including a split field polarizer and a rotatable analyzer.

A further object of the present invention is to provide means for detecting X- and gamma radiation, said means including an alkali halide crystal which changes color when subjected to X- and gamma radiation.

A still further object of the present invention is to provide a compact but accurate dosimeter which includes an alkali halide crystal that becomes blue in color when subjected to X- or gamma radiation and means for measuring the change in color, said means comprising a red filter, a split field polarizer and a rotatable analyzer.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein:

Figure 1 is a longitudinal cross-sectional view of one form of detecting device embodying the present invention;

Fig. 2 is an exploded view of the detecting device of Fig. 1 showing each of the elements of said detecting device in perspective;

Fig. 3 is a longitudinal cross-sectional view of an alternative form of detecting device embodying the present invention; and Fig. 4 is an exploded view of the detecting device of Fig. 3 showing each of the elements of said detecting device in perspective.

A detecting device embodying the invention herein disclosed may be provided with a split field polarizer having two sections, the polarizing axis, or the axis of transmission, of the first of said sections being crossed with respect to the axis of transmission of the second. When light is projected through such a field and is directed toward an analyzer (polarizer at the eye of an observer) having a single axis of transmission, an observer viewing the split field polarizer through the analyzer may rotate the analyzer until the aforementioned first and second sections appear equally bright. If a light absorber is placed between the first of the aforementioned sections and the source of light, the position of the analyzer at which the brightnesses of the sections appear equal will shift and the amount of shift will bear a functional relationship to the density of the aforementioned light absorber. Such a light absorber may comprise a detecting element, the optical characteristics of which may change in the presence of a particular phenomenon. In particular, the light absorber may comprise a detecting element, the optical density of which changes upon subjection of said detecting element to X- or gamma radiation. It is expressly to be understood, however, that phenomena other than X- or gamma radiation may be detected in this manner. For example, with properly sensitive detecting elements, the presence of water vapor, of a particular gas, of radiation other than X- or gamma radiation, etc., may be detected.

In the illustrated embodiments of the present invention the phenomenon detected is X- or gamma radiation. Preferably, a detecting element is provided which has the property of changing in color when subjected to X- or gamma radiation. Such a detecting element may comprise an alkali halide crystal which first has been subjected to the action of alkali metal vapor at temperatures near the melting point of the crystal in question and secondly has been subjected to hydrogenation treatment. No visible coloration may be observed after the hydrogenation step, but, upon irradiation by X- or gamma rays, coloration takes place, the amount of coloration bearing a functional relationship to the dosage of incident radiation. Potassium bromide may be used to particular advantage because its comparatively low melting point enables ease of crystal sensitization and because its coloration is blue, with peak absorption in the red region of the spectrum.

Generally, the preferred form of the present invention comprises a split field polarizer having two sections, the axis of transmission of the first of said sections being crossed with respect to the axis of transmission of the second section. Red light, which preferably is provided by passing white light through a red filter, is projected through the split field and toward an analyzer having a single axis of transmission. A potassium bromide crystal is provided adjacent a first of the aforementioned sections. When this potassium bromide crystal is optically transparent, an optically transparent path exists from the aforementioned red filter through the split field polarizer and analyzer and to the eye of an observer. An observer viewing the split field polarizer through the analyzer may rotate the analyzer to an initial position at which the first and second sections of the split field polarizer appear an equally bright red. When the potassium bromide crystal has been subjected to X- or gamma radiation, it becomes blue in color and absorbs some of the red light passing through the first of the aforementioned segments. After the potassium bromide crystal has become blue in color, when the analyzer is in its initial position, the second secion will appear through the analyzer to be a brighter red than the other. The analyzer may now be rotated until both sections again appear an equally bright red, the amount of this rotation being indicative of the number of roentgens of X- or gamma radiation that the potassium bromide crystal has absorbed. Alkali crystals that have become colored by reason of subjection to X- or gamma radiation may be bleached to their original clarity by subjection to visual light and then may be reused as detecting elements. However, in order to prevent unwanted bleaching from occurring during subjection of said crystals to X- or gamma radiation, means are provided to normally protect such crystals from visible light.

Referring now to the drawings, wherein like numerals denote like parts, Figs. 1 and 2 illustrate a preferred embodiment of the present invention. A casing 20, preferably a tube of circular cross section, mounts the components of the preferred dosimeter. Suitably mounted within casing 20 is a detecting element 22 which, in the present embodiment, comprises a potassium bromide crystal having the property of becoming blue in color when subjected to X- or gamma radiation.

Light from any suitable source of illumination such as an electric lamp, the sun, etc., may enter the right end of casing 20, as viewed in Fig. 1. In order that light passing through detecting element 22 may be compared easily with light not passing therethrough, a transparent optical path 24 is provided closely adjacent to said detecting element 22. In the present embodiment, the transparent optical path comprises a transparent bar which may be composed of any substantially clear material such as glass, polystyrene, Lucite, etc. Detecting element 22 and bar 24 may be positioned side by side at the center of casing 20 by means of a suitable support 26, shown in the present embodiment as a frusto-cylindrical drum having milled therein a rectangular recess 28 which is adapted to hold detecting element 22 and bar 24. Also held in recess 28, and in contact with the inner ends of detecting element 22 and bar 24, respectively, are the polarizing elements 30 and 32. The axis of transmission of polarizing element 30 is indicated by arrow 31 and is crossed with respect to the axis of polarizing element 32 which is indicated by arrow 33. Viewing Fig. 1, support 26 may be prevented from moving to the left with respect to casing 20 by such means as a transparent Celluloid disk 34 which abuts against shoulder 36 of casing 20. Support 26 may be prevented from moving to the right by such means as a retaining sleeve 38 which is secured within casing 20 as by the screw means 40.

Detecting element 22 and bar 24 are adapted to transmit light from their outer ends adjacent the right end of casing 20 to their inner ends abutting polarizing elements 30 and 32, respectively. The longitudinal surfaces of detecting element 22 and bar 24 preferably have high reflectivity in order to prevent light loss therethrough and high diffusivity in order that the depth of detecting element 22 and of bar 24 will not be apparent to an observer. Such surface characteristics may be obtained, for example, by coating the longitudinal surfaces of detecting element 22 and bar 24 with a white titanium oxide paint. Thus, light entering the outer end of detecting element 22 leaves the inner end with little or no escape of light via the sides thereof. Similarly, light entering the outer end of bar 24 leaves the inner end with little or no escape of light via the sides thereof. The plane of polarization of light reaching disk 34 via detecting element 22 and polarizing element 30 is at right angles to the plane of polarization of light reaching disk 34 via bar 24 and polarizing element 32.

Preferably, in order to assure uniform illumination of the outer ends of detecting element 22 and bar 24, a light-diffusing means, such as ground glass disk 42, may be provided. Disk 42 may be secured at an end of casing 20 by suitable means such as the aforementioned retaining sleeve 38 and a retaining ring 44. In order that an observer may compare the brightness of the light passing through detecting element 22 with that of light passing through bar 24 without color imbalance, a filter means, shown at 46 as a segment-shaped and colored disk, is provided. Filter means 46 transmits radiation only in a portion of the visible spectrum. Since the red band of white light passing through detecting element 22 is attenuated when detecting element 22 has been subjected to X- or gamma radiation and has turned blue in color, it is desired to compare the brightness of this red light with the brightness of red light passing through transparent optical path 24. In the present embodiment, therefore, filter means 46 is colored red. Filter 46 may be held in position by means of the aforementioned disk 34 and a retaining ring 48.

As indicated above, an analyzer is provided through which an observer may view light emanating from the crossed polarizing elements 30 and 32. As shown, the analyzer is designated at 50 and consists of a full field polarizing element, the axis of transmission of which is indicated by arrow 51, and which is mounted in a rotatable eye piece 52. Eye piece 52 may be rotatably mounted in casing 20 as by means of threads 54. Also mounted in eye piece 52 may be a lens 56 which is focused on filter 46. Lens 56 may be mounted in eye piece 52 as by the retaining rings 58 and 60. Analyzer 50 may be mounted in eye piece 52 as by retaining ring 62 and a retaining ring 64.

White light entering casing 20 through disk 42 passes through detecting element 22, polarizing element 30 and disk 34 to form a first red spot on filter 46. Additionally, white light entering casing 20 through disk 42 passes through bar 24, polarizing element 32 and disk 34 to form a second red spot of light on filter 46. If the detecting element 22 has been subjected to no X- or gamma radiation, the analyzer can be made to assume an initial position at which the first and second red spots appear equal in brightness. If detecting element 22 has been subjected to X- or gamma radiation, it will increase in density and, at the initial position of analyzer 50, the first spot of light will appear less bright than the second spot. The analyzer 50 now may be rotated until the first and second spots of light again appear an equally bright red to an observer looking through analyzer 50, the amount of rotation of analyzer 50 being indicative of the number of roentgens of X- or gamma radiation to which the detecting device has been subjected.

The present embodiment comprises novel indicating means by which the amount of rotation of analyzer 50, with respect to casing 20, may be determined. As above indicated, the mounting means for detecting element 22 and bar 24 is frusto-cylindrical in shape. As is shown in Fig. 1, an uninterrupted path of air extends from disk 42 along the lower edge of casing 20 to disk 34. At the lower edge of disk 34 may be placed a scale of graduations 68 which is adapted to be illuminated by light from disk 42. Since the lower portion of filter 46 also is cut away, graduations 68 on Celluloid disk 34 are clearly visible to an observer looking into eye piece 52. The amount of rotation of eye piece 52 with respect to scale 68 may be determined by such means as the cross hairs 70 which may be mounted at the inner end of eye piece 52.

As stated above, alkali halides which have become colored under the incidence of X- or gamma radiation may be bleached when subjected to visual light for an appreciable period of time. In order to prevent unwanted bleaching of the detecting element in the present embodiment, means are provided for rendering the detecting device light-tight. Casing 20 and eye piece 52 may be composed of a material, such as thin aluminum, which is opaque to visual light but which does not appreciably attenuate X- or gamma radiation. The open ends of casing 20 and eye piece 52 may be provided with caps 72 which are composed of the same material as are casing 20 and eye piece 52. If it is desired to detect only hard (short wavelength) gamma rays, casing 20, eye piece 52 and caps 72 may be coated with a thin layer of lead that may be, for example, one-thirty-second of an inch thick. If desired, the preferred detecting device, after having been subjected to X- or gamma radiation, may be readied for re-use by removal of caps 72 and exposure to strong light.

In the operation of the detecting device of Figs. 1 and 2, caps 72 may be removed from the ends of casing 20 and eye piece 52. An observer then may point the device toward a source of illumination and peer into eye piece 52. When the detecting device has not been exposed to X- or gamma radiation and cross hair 70 is on the zero mark of scale of graduations 68, an observer sees two spots of equally bright red light. If now the detecting device is subjected to X- or gamma radiation, an observer peering into eye piece 52 must rotate eye piece 52 to a given position in order to equalize the brightness of the aforementioned two spots of light. At this position of eye piece 52, cross hair 70 is superposed on one of the graduations of scale 68 and the number of roentgens of radiation that has fallen on detecting element 22 may be read directly. When it is desired to eradicate the effect on the detecting element of X- or gamma radiation, caps 72 may be removed from the ends of casing 20 and eye piece 52 and the device may be exposed to bright light in order to bleach the detecting element to its original optical clarity. Caps 72 then may be placed on the ends of casing 20 and eye piece 52, after which the detecting device will be ready for a new exposure to X- or gamma radiation.

In Figs. 3 and 4 there is disclosed an alternative embodiment of the present invention. Casing 80, preferably of circular cross section, mounts the components of the dosimeter of Figs. 3 and 4. In the alternative embodiment, a detecting element 82 may be provided which may comprise a crystal of potassium bromide that has been milled to cylindrical shape and that has the property of becoming blue in color when subjected to X- or gamma radiation. Detecting element 82 may be positioned along the axis of casing 80 by such means as a transparent cylinder 84 which is snugly received in casing 80 and which is provided with a bore 86 in which may be secured detecting element 82. Cylinder 84 serves additionally as a transparent optical path for light with which light passing through detecting element 82 may be compared. Cylinder 84 may be composed of any substantially clear material such as glass, polystyrene, Lucite, etc.

In the alternative embodiment, a split field polarizing element 88 may be positioned at the inner ends of cylinder 84 and detecting element 82. A central section 89 of polarizing element 88 is in contact with, and is coextensive with the inner end of detecting element 82. An outer annular section 90 of polarizing element 88 is in contact with, and is coextensive with the annular portion of the inner end of cylinder 84 which surrounds the inner end of detecting element 82. The axis of transmission of the central section 89 of split field polarizing element 88 is crossed with respect to the axis of transmission of the annular section 90 of split field polarizing element 88.

The longitudinal surfaces of element 82 and cylinder 84, preferably, are rendered reflective and diffusive by such means as white paint. Thus, detecting element 82 and cylinder 84 are adapted to transmit light from their outer ends adjacent the right end of casing 80, as viewed in Fig. 3, to their inner ends abutting split field polarizing element 88 with negligible light loss. In order to uniformly illuminate the outer ends of detecting element 82 and cylinder 84, the outer end of cylinder 84 may be rough ground, as at 91, to provide a diffusing surface for light entering the right end of casing 80. In order that an observer may compare the brightness of light passing through detecting element 82 and that of light passing through the peripheral portion of cylinder 84, without color imbalance, a red filter 92, which transmits only radiation in the red region of the visible spectrum, is provided. Split field polarizing element 88, cylinder 84, detecting element 82 and filter 92 may be suitably secured within casing 80 as by means of the retaining rings 94 and 96.

Red light entering casing 80 through filter 92 and rough ground surface 91 passes through cylinder 84 and detecting element 82 to illuminate the central section 89 of split field polarizing element 88. Such red light also passes through the annular end of cylinder 84 to illuminate the annular section 90 of split field polarizing element 88. An analyzer 100 may be provided through which an observer may compare light emanating from the central and annular sections of split field polarizing element 88. Preferably, analyzer 100 consists of a full field polarizing element which is mounted in a rotatable eye piece 102. Also mounted in eye piece 102 may be a lens 104 which is preferably focused on split field polarizing element 88. The retaining rings 106 and 108 are provided for securing lens 104 in eye piece 102. Retaining ring 108 and a retaining ring 109 are adapted to secure analyzer 100 in eye piece 102. White light entering casing 80 through filter 92 and rough ground end 91 of cylinder 84 passes through the peripheral portion of cylinder 84 to illuminate annular section 90 of polarizing element 88 and passes through detecting element 82 to illuminate central section 89 of polarizing element 88. If detecting element 82 has been subjected to no X- or gamma radiation, analyzer 100 can be made to assume an initial position at which the central and annular sections of polarizing element 88 will appear equal in brightness. If the detecting element 82 has been subjected to X- or gamma radiation, central section 89 will be less bright than annular section 90 because of absorption of red light by detecting element 82 and will appear less bright than said annular section when analyzer 100 is at the aforementioned initial position. Analyzer 100 may now be rotated until both the central and annular sections again appear an equally bright red to an observer peering through analyzer 100, the amount of rotation of analyzer 100 being indicative of the number of roentgens of X- or gamma radiation to which the detecting device has been subjected.

The alternative embodiment of the present invention is provided with combined means for determining the amount of rotation of eye piece 102 with respect to casing 80 and for preventing withdrawal of eye piece 102 from casing 80. Withdrawal of eye piece 102 from casing 80 may be prevented by a pointer 110 which is attached to eye piece 102 and which extends through a slot 112 in casing 80. Pointer 110 is adapted to coact with a scale 114 to indicate the degree of rotation of eye piece 102 with respect to casing 80 and thus to indicate the number of roentgens of X- and gamma radiation to which the preferred alternative detecting device has been subjected.

In order to prevent unwanted bleaching of the detecting element 82 in the presence of too much visual light, casing 80 and eye piece 102 may be provided with such means as the caps 116 for rendering the detecting device of Figs. 3 and 4 light-tight.

The operation of the embodiment of the present invention shown in Figs. 3 and 4 is similar to that of the embodiment shown in Figs. 1 and 2.

In addition to the embodiments above described in detail, numerous other modifications are within the scope of the present invention. For example, an optical path of air could be substituted for bar 24 of Figs. 1 and 2 or for cylinder 84 of Figs. 3 and 4. Furthermore, metal fins could serve to support the detecting elements within their respective casings. Additionally, it is recognized that the axes of transmission of the sections of the split field polarizing elements may be fixed at angles to each other of other than ninety degrees or may be adjustable with respect to each other.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. An X- and gamma radiation detecting device comprising a casing, a detecting element mounted within said casing, said detecting element including a potassium bromide crystal which becomes blue in color when subjected to X- or gamma radiation, a transparent element for providing a transparent optical path, said transparent element being in surrounding relation to said detecting element, said detecting element and said transparent element being adapted to be illuminated, means for diffusing light that is received by said detecting element and by said transparent element, a red filter for light passing through said detecting element and transparent element, a first polarizing means for receiving light from said detecting element, a second polarizing means for receiving light from said transparent element, the axis of transmission of said first polarizing means being at an angle to the axis of transmission of said second polarizing means, rotatable polarizing means for comparing light passing through said first and second polarizing means, and means for indicating the angular position of said rotatable polarizing means with respect to said first and second polarizing means.

2. The X- and gamma radiation detecting device of claim 1 wherein said casing is provided with a slot perpendicular to the longitudinal axis of said casing, a scale of graduations adjacent said slot, and a pointer rotatable with said rotatable polarizing means and extending through said slot.

3. An X- and gamma radiation detecting device comprising a tubular casing, an elongated potassium bromide crystal mounted within said casing, an elongated transparent element for providing a transparent optical path mounted within said casing and parallel and adjacent to said detecting element, said detecting element and said transparent element having longitudinal surfaces of high reflectivity, a rough ground glass disk for diffusing light that is received by said detecting element and by said transparent element, a red filter for light passing through said detecting element and transparent element, a first polarizing means for receiving light from said detecting element, a second polarizing means for receiving light from said transparent optical path, the axis of transmission of said first polarizing means being at an angle to the axis of transmission of said second polarizing means, rotatable polarizing means for comparing light passing through said first and second polarizing means, and means for indicating the angular position of said rotatable polarizing means with respect to said first and second polarizing means.

4. The X- and gamma radiation detecting device of claim 3 wherein said last mentioned means comprises a transparent disk which is adapted to be illuminated by light passing through said means for diffusing light that is received by said detecting element and by said optical path, said transparent disk having a scale of graduations thereupon, and cross hairs mounted for rotation with said rotatable polarizing means.

5. An X- and gamma radiation detecting device comprising a casing, a cylindrical transparent element mounted within said casing, said transparent element having a bore extending from adjacent one end thereof through the other end thereof, a cylindrical detecting element mounted within said bore, said detecting element including a potassium bromide crystal which becomes blue in color when subjected to X- or gamma radiation, said one end of said transparent element being adapted to receive light and being rough ground to evenly disperse said light through said detecting element and said transparent element, the longitudinal surfaces of said transparent element and said detecting element being of high reflectivity, a red filter for light passing through said detecting element and transparent element, a first polarizing means for receiving light from said detecting element, a second annular polarizing means for receiving light from said transparent element, the axis of transmission of said first polarizing means being at an angle to the axis of transmission of said second polarizing means, rotatable polarizing means for comparing light passing through said first and second polarizing means, and means for indicating the angular position of said rotatable polarizing means with respect to said first and second polarizing means.

6. The X- and gamma radiation detecting device of claim 5 wherein said casing is provided with a slot perpendicular to the longitudinal axis of said casing, a scale of graduations adjacent said slot, and a pointer rotatable with said rotatable polarizing means and extending through said slot.

7. A detecting device comprising a housing, a detecting element within said housing so constituted as to assume a given color of given density when subjected to a phenomenon of given intensity, means providing a transparent optical path adjacent to said detecting element, a first polarizing means associated with said detecting element, a second polarizing means associated with said optical path, said first polarizing means and said second polarizing means being differently oriented, a third polarizing means rotatably mounted with respect to said first and second polarizing means for comparing light directed through said first and second polarizing means, diffusing means for light received by said detecting element and said optical path, filter means for transmitting light of said given color received by said detecting element and said optical path, and means for indicating the angular position of said third polarizing means with respect to said first and second polarizing means.

8. A radiation detecting device comprising a housing, a detecting element within said housing, said detecting element being so constituted as to assume a given color of given density when subjected to a phenomenon of given intensity, a plastic element within said housing providing a transparent optical path adjacent to said detecting element, translucent means at one end of said detecting element and one end of said plastic element for diffusing light received by said detecting element and said plastic element, an optical filter within said housing for transmitting light of said given color which is directed through said detecting element and said plastic element, a first polarizing means within said housing for light transmitted through said detecting element, a second polarizing means within said housing for light transmitted through said plastic element, said first polarizing means and said second polarizing means being differently oriented, a third polarizing means rotatably mounted in said housing on the opposite end of said detecting element and said plastic element for receiving light directed through said first and second polarizing means, and means for indicating the angular position of said third polarizing means with respect to said first and second polarizing means.

9. A short-wave radiation detecting device comprising a housing, a detecting element within said housing, said detecting element being an alkali halide crystal so constituted as to assume a given color of given density when subjected to short-wave radiation of given intensity, a plastic element within said housing providing a transparent optical path adjacent to said detecting element, translucent means at one end of said detecting element and one end of said plastic element for diffusing light received by said detecting element and said plastic element, an optical filter within said housing for transmitting light of said given color which is directed through said detecting element and said plastic element, a first polarizing means within said housing for light directed through said detecting element, a second polarizing means within said housing for light directed through said plastic element, said first polarizing means and said second polarizing means being differently oriented, a third polarizing means rotatably mounted in said housing at the opposite end of said detecting element and the opopsite end of said plastic element for receiving light directed through said first and second polarizing means, and means for indicating the angular position of said third polarizing means with respect to said first and second polarizing means.

10. An X- and gamma radiation-detecting device comprising a casing, a detecting element mounted within said casing, said detecting element including a potassium bromide crystal which becomes blue in color when subjected to X- or gamma radiation, a transparent element for providing a transparent optical path lying alongside said detecting element, said detecting element and said transparent element being adapted to be uniformly illuminated, means for diffusing light that is received by said detecting element and by said transparent element, a red filter for light passing through said detecting element and said transparent element, a first polarizing means for receiving light from said detecting element, a second polarizing element for receiving light from said transparent optical path, the axis of transmission of said first polarizing means being at an angle to the axis of transmission of said second polarizing means, rotatable polarizing means for comparing light passing through said first and second polarizing means, a transparent disk which is adapted to be illuminated by light passing through said means for diffusing light and said optical path, said transparent disk having a scale of graduations thereupon, and cross hairs mounted for rotation with said rotatable polarizing means.

11. A radiation detecting device comprising an elongated housing, an elongated detecting element within said housing, said detecting element being so constituted as to assume a given color of given density when subjected to a phenomenon of given intensity, an elongated transparent element within said housing, the axes of elongation of said housing, said detecting element and said transparent element being substantially parallel, a translucent element at one end of said housing for diffusing light received by one end of said detecting element and one end of said transparent element, a color filter within said housing for transmitting light of said given color which is directed through said detecting element and said transparent element, a first polarizing element adjacent to one end of said detecting element for light transmitted therethrough, a second polarizing element adjacent to one end of said transparent element for light transmitted therethrough, said first polarizing element and said second polarizing element being differently oriented, a third polarizing element rotatably mounted in said housing at the other end thereof for receiving light directed through said first polarizing element and said second polarizing element, and means for indicating the angular position of said third polarizing element with respect to said housing.

References Cited in the file of this patent

UNITED STATES PATENTS

| Number | Name | Date |
|---|---|---|
| 1,976,728 | Hulburt | Oct. 16, 1934 |
| 1,959,549 | Sauer | May 22, 1934 |
| 1,990,022 | De Mond et al. | Feb. 5, 1935 |
| 2,246,817 | Sauer | June 24, 1941 |
| 2,578,703 | Hopkins et al. | Dec. 18, 1951 |
| 2,616,051 | Daniels | Oct. 28, 1952 |

References Cited in the file of this patent

UNITED STATES PATENTS

| Number | Name | Date |
|---|---|---|
| 17,666 | Great Britain | Sept. 24, 1903 |